United States Patent [19]
Kim

[11] Patent Number: 6,115,141
[45] Date of Patent: Sep. 5, 2000

[54] METHOD AND APPARATUS FOR RE-TRANSMITTING RECEIVED FACSIMILE MESSAGE

[75] Inventor: Jeong-Rae Kim, Seoul, Rep. of Korea

[73] Assignee: SamSung Electronics Co., Ltd., Suwon, Rep. of Korea

[21] Appl. No.: 09/024,114

[22] Filed: Feb. 17, 1998

[30] Foreign Application Priority Data

Feb. 14, 1997 [KR] Rep. of Korea .................. 97-4368

[51] Int. Cl.[7] ........................................ H04N 1/00
[52] U.S. Cl. .................. 358/404; 358/407; 358/440
[58] Field of Search .................. 358/400, 404, 358/407, 434, 440, 444, 468

[56] References Cited

U.S. PATENT DOCUMENTS

| | | | |
|---|---|---|---|
| 5,196,943 | 3/1993 | Hersee et al. ........................... | 358/403 |
| 5,210,621 | 5/1993 | Kinoshita ................................ | 358/440 |
| 5,220,438 | 6/1993 | Yamamoto ............................. | 358/404 |
| 5,287,199 | 2/1994 | Zoccolillo .............................. | 358/407 |
| 5,291,305 | 3/1994 | Sakashita et al. .................... | 358/444 |
| 5,295,181 | 3/1994 | Kuo ...................................... | 379/100.07 |
| 5,337,349 | 8/1994 | Furohashi et al. .................. | 379/100.14 |
| 5,353,125 | 10/1994 | Nakagawa et al. ................. | 358/439 |
| 5,488,651 | 1/1996 | Giler et al. ........................... | 358/407 |
| 5,523,854 | 6/1996 | Hornsby ............................... | 358/407 |
| 5,555,100 | 9/1996 | Bloomfield et al. ................ | 358/402 |
| 5,559,611 | 9/1996 | Bloomfield et al. ................ | 358/407 |
| 5,631,745 | 5/1997 | Wong et al. ......................... | 358/434 |
| 5,638,185 | 6/1997 | Kato et al. ........................... | 358/434 |
| 5,668,640 | 9/1997 | Nozawa et al. .................... | 358/440 |
| 5,675,507 | 10/1997 | Bobo, II ............................. | 709/206 |
| 5,701,183 | 12/1997 | Bellemare et al. ................ | 358/404 |

*Primary Examiner*—Kimberly A. Williams
*Attorney, Agent, or Firm*—Robert E. Bushnell, Esq.

[57] ABSTRACT

A facsimile re-transmits a received facsimile message to another subscriber without degradation of image quality. The facsimile includes first and second memories. The first memory stores the facsimile message received from a calling facsimile, receiving information for the facsimile message, and a selection number for selecting the received facsimile. The second memory stores facsimile numbers for subscribers to which the received facsimile is to be re-transmitted. At the user's request, the facsimile dials the facsimile numbers stored in the second memory to re-transmit the received facsimile message stored in the first memory to the subscribers.

32 Claims, 4 Drawing Sheets

RE-TRANSMISSION LIST

DATE: 1996. 8. 21.
FAX NO. : 0331-280-9882
NAME : JEONG-RAE KIM

| SELECTION NO | FAX NUMBER | DATE & TIME | PAGE |
|---|---|---|---|
| 01 | 0331-280-9859 | 1996 _ 8 _ 21 16:20 | 04 |
| 02 | 02-745-0084 | 1996 _ 8 _ 21 10:15 | 02 |
| 03 | 565-1440 | 1996 _ 8 _ 20 22:10 | 01 |

FIG. 4

METHOD AND APPARATUS FOR RE-TRANSMITTING RECEIVED FACSIMILE MESSAGE

CLAIM OF PRIORITY

This application makes reference to, incorporates the same herein, and claims all benefits accruing under 35 U.S.C. §119 from an application for METHOD FOR RE-TRANSMITTING RECEIVED FACSIMILE MESSAGE earlier filed in the Korean Industrial Property Office on the 14th of February 1997 and there duly assigned Ser. No. 4368/1997.

BACKGROUND OF THE INVENTION

1. Technical Field

The present invention relates to a facsimile, and in particular, to a method and apparatus for transmitting and receiving a facsimile message in a facsimile.

2. Related Art

In order for a facsimile to transmit a facsimile document to another facsimile, the calling facsimile first scans the facsimile document to generate image data corresponding to the document, and encodes the image data. The encoded image data is generally called the facsimile message. The facsimile message is transmitted to the called facsimile via a telephone line. Then, the called facsimile decodes the facsimile message received via the telephone line into the original image data, and prints the image data on a recording sheet as printed matter. However, the quality of the printed matter becomes lowered as the image undergoes the scanning, encoding, transmitting, decoding, and printing processes.

When one desires to secondarily re-transmit the primary printed matter obtained in the above manner, since the primary printed matter has a lower quality compared to the original document, the secondary printed matter will have an image quality which is much lower than that of the original document. Thus, the secondary printed matter may be illegible. Furthermore, since a facsimile adopting an ink-jet printing technique prints the facsimile message in a reduced size, degradation of the primary and secondary printed matters becomes more serious.

The following patents are considered to be representative of the prior art relative to the present invention, but are burdened by the disadvantage discussed above: U.S. Pat. No. 5,701,183 to Bellemare et al., entitled Apparatus And Method For Selective Archiving Of Facsimile Messages, U.S. Pat. No. 5,675,507 to Bobo II, entitled Message Storage And Delivery System, U.S. Pat. No. 5,638,185 to Kato et al., entitled Mobile Facsimile Machine, U.S. Pat. No. 5,631,745 to Wong et al., entitled Multi-Function Telecommunications Instrument, U.S. Pat. No. 5,559,611 to Bloomfield et al., entitled Facsimile Store And Forward System With Local Interface, U.S. Pat. No. 5,555,100 to Bloomfield et al., entitled Facsimile Store And Forward System With Local Interface Translating DTMF Signals Into Store And Forward System Commands, U.S. Pat. No. 5,523,854 to Hornsby, entitled Store And Forward Data Transmission, U.S. Pat. No. 5,488,651 to Giler et al., entitled Fax Message System, U.S. Pat. No. 5,353,125 to Nakagawa et al., entitled Facsimile Apparatus, U.S. Pat. No. 5,337,349 to Furohashi et al., entitled Image Telecommunication Apparatus, U.S. Pat. No. 5,295,181 to Kuo, entitled Automatic Facsimile Output Recipient Telephoning System, U.S. Pat. No. 5,291,305 to Sakashita et al., entitled Facsimile Network System Capable Of Carrying Out Broadcast Communication, U.S. Pat. No. 5,287,199 to Zoccolilo, entitled Facsimile Message Processing And Routing System, U.S. Pat. No. 5,210,621 to Kinoshita, entitled Facsimile Apparatus, and U.S. Pat. No. 5,196,943 to Hersee et al., entitled Facsimile Information Distribution Apparatus.

SUMMARY OF THE INVENTION

It is, therefore, an object of the present invention to provide a method for re-transmitting a received facsimile message without degradation of image quality.

To achieve the above and other objects, there is provided a method for re-transmitting a received facsimile message in a facsimile including first and second memories. The method includes the steps of receiving the facsimile message from a calling facsimile; storing the received facsimile message in the first memory, together with receiving information for the facsimile message and a selection number for selecting said received facsimile message; storing in the second memory facsimile numbers for subscribers to which the received facsimile is to be re-transmitted; and dialing the facsimile numbers stored in the second memory to re-transmit the received facsimile message stored in the first memory to said subscribers.

Preferably, the first memory is a random access memory (RAM) and the second memory is a buffer memory prepared in a central processing unit (CPU).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 shows a re-transmission list, by way of example, according to a preferred embodiment of the present invention.

DETAILED DESCRIPTION OF THE PREFERRED EMBODIMENT

Figure 1:
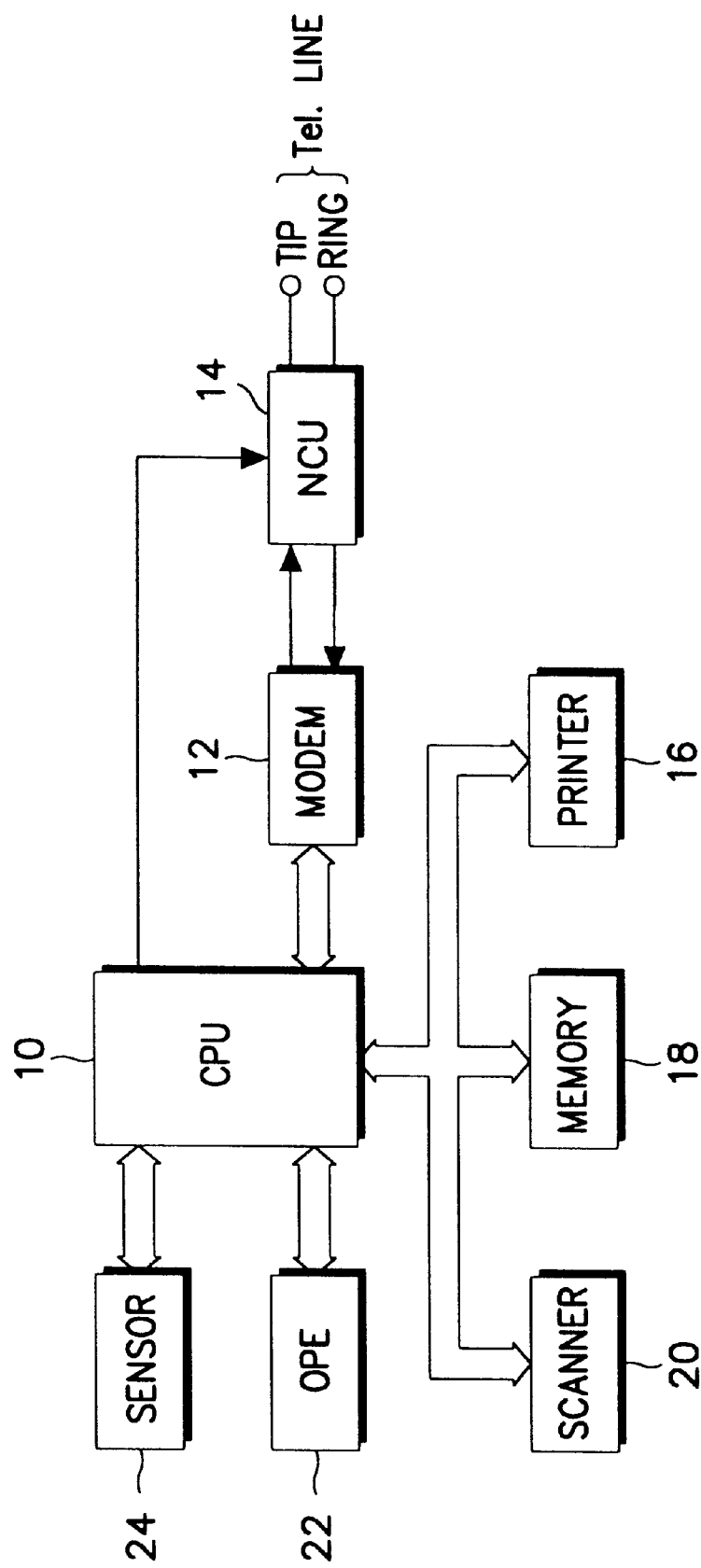
FIG. 1 is a schematic block diagram of a facsimile to which the present invention is applicable.

A preferred embodiment of the present invention will be described in detail referring to the attached drawings, in which the like reference numerals denote the same elements in the drawings, for understanding. Though the specific embodiment such as the detailed flow chart will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

The present invention is directed to storing a received facsimile message so as to re-transmit it to another facsimile when necessary, thereby preventing degradation of the image quality. Thus, the facsimile according to the present invention should include a separate memory area for storing the received facsimile message.

However, an existing facsimile which adopts a page printing technique has a memory area for storing the received facsimile message. Thus, when the present invention is applied to the facsimile adopting the page printing technique, the facsimile need not have a separate memory area. FIG. 1 illustrates a facsimile including a printer 16 adopting the page printing technique. In the drawing, a central processing unit (CPU) 10 controls the overall operation of the facsimile according to a program. A modem 12 modulates image data in a transmission mode and demodulates the image data in a reception mode under the control of the CPU 10. An NCU (Network Control Unit) 14 forms a communication channel between a telephone line and the modem 12 under the control of the CPU 10. The printer 16 prints an image on a recording sheet under the control of the CPU 10. Preferably, the printer 16 is an ink-jet page printer or a laser beam page printer. A memory 18 includes a program memory (i.e., ROM (Read Only Memory)) for storing the program, and a data memory (i.e, RAM (Random Access Memory)) for temporarily storing data generated in the process of executing the program. A scanner 20 reads (scans) an original document under the control of the CPU 10. An operating panel equipment (OPE) 22 includes a plurality of keys and a display for interfacing between a user and the CPU 10. A sensor 24 senses various operational states of the facsimile to provide the CPU 10 with sensing data in accordance therewith.

Figure 2:
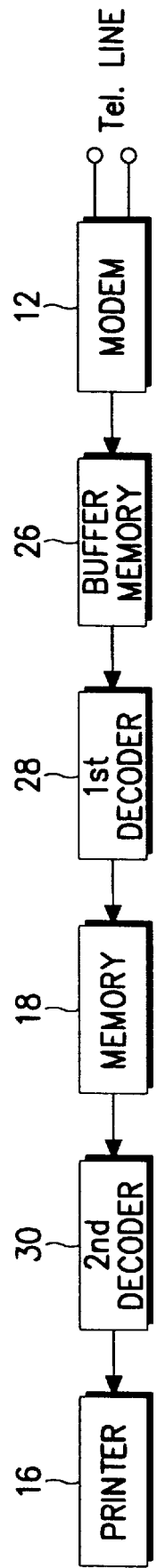
FIG. 2 is a block diagram illustrating the process flow of a facsimile message in the facsimile of FIG. 1.

FIG. 2 shows the process flow of a facsimile message, which is applicable to the facsimile of FIG. 1. With reference to FIG. 2, the modem 12 demodulates the facsimile message received from the telephone line to obtain a digital facsimile message and stores it in a buffer memory 26. The buffer memory 26 (provided in the CPU 10) buffers the digital facsimile message from the modem 12 and provides an output thereof to a first decoder 28 under the control of the CPU 10. The first decoder 28 provided in the CPU 10) performs an error check and an error correction function for the received digital facsimile message, and then stores the processed digital facsimile message in memory 18. The digital facsimile message stored in the memory 18 is applied to a second decoder 30 by the page. The second decoder 30 (provided in the CPU 10) converts the digital facsimile message read out from the memory 18 into image data, such as bit map image data, by the page, and then transfers it to the printer 16. The printer 16 prints the image data on the recording sheet by the page.

Figure 3:
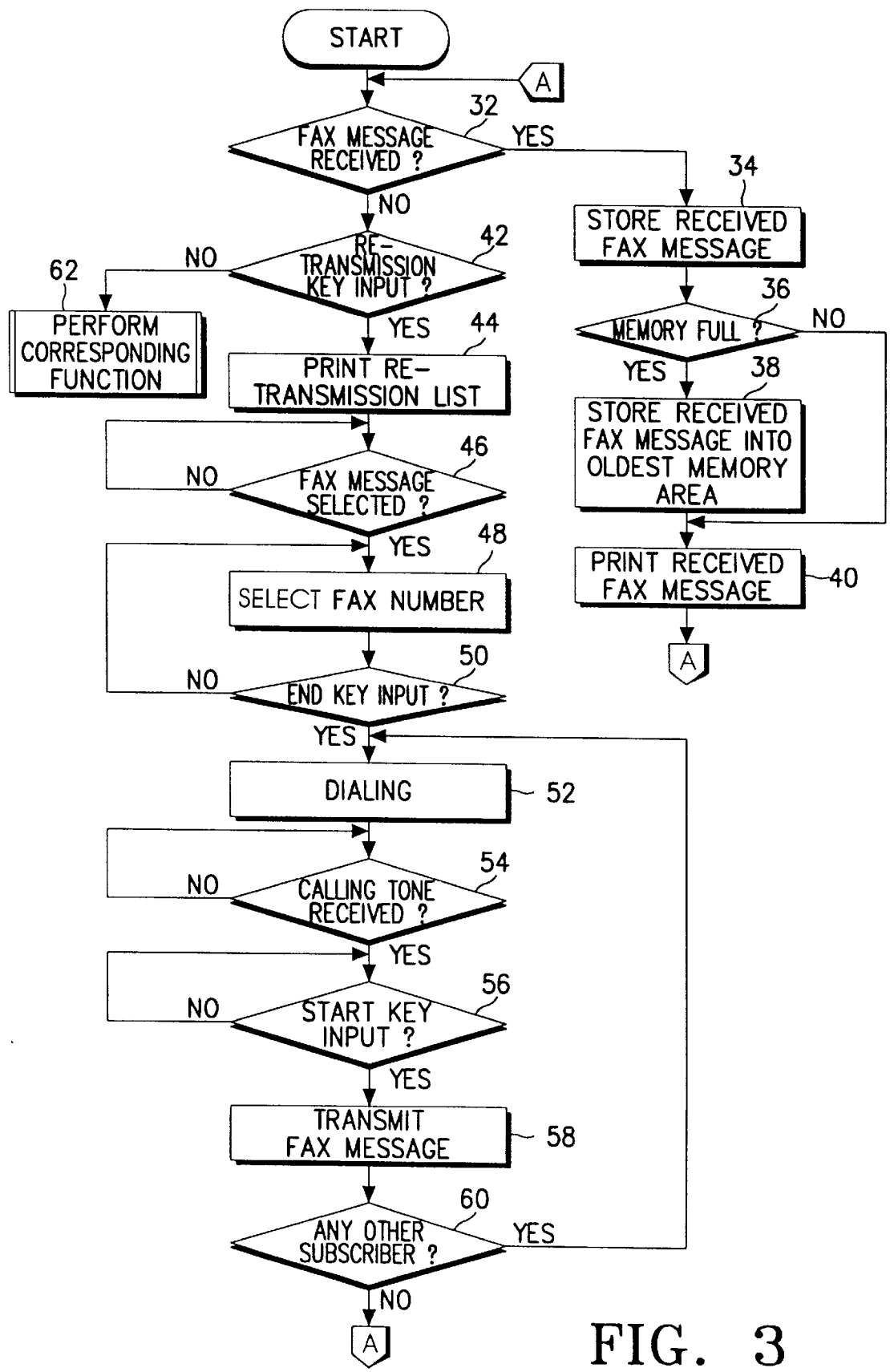
FIG. 3 is a flow chart for re-transmitting a received facsimile message according to a preferred embodiment of the present invention.

FIG. 3 illustrates a flow chart for re-transmitting the facsimile message received from another facsimile, which is applicable to the facsimile described above. With reference to FIG. 3, operation of the facsimile according to the present invention will be described in detail hereinbelow. At step 32, the CPU 10 checks whether a facsimile message is received from a calling facsimile via the telephone line. If the facsimile message is received, the CPU 10 performs at step 34 an error check and an error correction operation for the received facsimile message by virtue of the first decoder 28, and stores the resultant facsimile message in the memory 18 having a memory map as shown in Table 1.

TABLE 1

| Selection No. | Contents |
| --- | --- |
| 1 | Firstly Received Facsimile Message and its Receiving Information |
| 2 | Secondly Received Facsimile Message and its Receiving Information |

TABLE 1-continued

| Selection No. | Contents |
| --- | --- |
| 3 | Thirdly Received Facsimile Message and its Receiving Information |
| 4 | Fourthly Received Facsimile Message and its Receiving Information |
| . | . |
| . | . |

As shown in Table 1, the received facsimile messages are sequentially stored in the memory 18, together with their corresponding selection numbers and receiving information Here, the selection number refers to a serial number for a received facsimile message, and the receiving information includes, for example, a facsimile number for the calling party, date and time of the transmission, and the number of pages.

After storing the received facsimile message and the receiving information, the CPU 10 proceeds to step 36 to check whether the memory 18 is in a full state, indicating that the memory 18 can no longer store the received facsimile message. If so, the CPU 10 proceeds to step 38 to store the received facsimile message by overwriting it into a memory area into which the oldest received facsimile message is stored. Thereafter, at step 40, the CPU 10 converts the received facsimile message into image data by virtue of the second decoder 30, and provides it to the printer 16 so as to print the received facsimile message on the recording sheet. If the memory 18 is not in the full state at step 36, the CPU 10 proceeds directly to step 40. After completion of the print, the CPU 10 returns to step 32.

If the facsimile message is not received at step 32, the CPU 10 checks at step 42 whether the user has depressed a RE-TRANSMISSION key to retransmit the received facsimile message to other subscribers. The CPU 10 will proceed to step 44 if the RE-TRANSMISSION key is depressed, and to step 62 if not. At step 44, the CPU 10 reads the selection numbers and the receiving information from the memory 18 so as to print the re-transmission list, as shown in FIG. 4, on the recording sheet by means of the printer 16. As shown in FIG. 4, the re-transmission list includes the selection number and the receiving information for the received facsimile messages, stored sequentially in the memory 18.

The user may choose the received facsimile message that he desires to re-transmit to the other subscriber by choosing the corresponding selection number on the transmission list. After completion of printing of the re-transmission list, the CPU 10 checks at step 46 whether a numeric key corresponding to any one of the selection numbers is depressed. If a numeric key is depressed, the CPU 10 selects the facsimile number that the user depresses, and stores it in the buffer memory 26 at step 48. The CPU 10 checks at step 50 whether the user has depressed an END key representative of completion of depressing the facsimile number, or a CONTINUE key representative of depressing another facsimile number. If the END key is depressed, the CPU 10 proceeds to step 52 to dial the facsimile number; if the CONTINUE key is depressed, the CPU 10 returns to step 48 to receive another facsimile number that the user depresses. That is, at steps 48 thru 50, the CPU 10 receives a plurality of the facsimile numbers that the user depresses, and stores them sequentially in the buffer memory 26.

After completion of storing of the facsimile numbers, the CPU 10 reads the facsimile number stored in the buffer memory 26 thereof, and dials the facsimile number at step 52. When the buffer memory 26 has a plurality of facsimile numbers stored therein, the CPU 10 dials each of the facsimile numbers in turn in the order of reception. After dialing a facsimile number, the CPU 10 clears the dialed facsimile number. In response to the dialing, a telephone exchange system (not shown) transmits a ring signal to the called facsimile. At this moment, if the called facsimile responds to the ring signal, the telephone exchange system will provide a calling tone to the calling facsimile.

Thus, after dialing of the facsimile number, the CPU 10 checks at step 54 whether the calling tone is received from the telephone exchange system. If the calling tone is received, the CPU 10 checks at step 56 whether the user has depressed a START key on the operating panel equipment 22 so as to retransmit the facsimile message to the called facsimile. If the START key is depressed, the CPU 10 proceeds to step 58; if it is not depressed, the CPU 10 waits for depression of the START key. At step 58, the CPU 10 transmits the selected facsimile message to the called facsimile via the telephone line. Upon completion of the transmission, the CPU 10 checks at step 60 whether the buffer memory 26 has more facsimile numbers for other subscribers to which the facsimile message is to be re-transmitted. If the buffer memory 26 has more facsimile numbers which are not cleared, the CPU 10 returns to step 52 so as to re-transmit the received facsimile message to the facsimile corresponding to the next facsimile number. However, if the buffer memory 26 has no facsimile number, a return to step 32 is executed.

As described above, the facsimile according to the present invention stores the primary received facsimile message into memory so as to secondarily re-transmit the received facsimile message to another facsimile, thereby preventing degradation of the re-transmitted secondary image.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A method for re-transmitting a facsimile message in a facsimile including first and second memories, comprising the steps of:

receiving the facsimile message from a calling facsimile;

storing, in said first memory, said received facsimile message together with receiving information for said facsimile message and a selection number for selecting said received facsimile message;

storing, in said second memory, facsimile numbers for subscribers to which said received facsimile is to be re-transmitted; and dialing said facsimile numbers stored in the second memory to re-transmit the received facsimile message stored in said first memory to said subscribers;

said method further comprising the steps of receiving a request by a user for printing of a re-transmission list and printing said receiving information and said selection number stored in said first memory in response to the request by the user for printing of the re-transmission list.

2. A method for re-transmitting a facsimile message according to claim 1, wherein said receiving information comprises a facsimile number for the calling facsimile, a transmission date and time, and a number of pages.

3. A method for re-transmitting a facsimile message according to claim 1, further comprising the steps of:

checking whether or not said fist memory is in a full state; and storing said received facsimile message by overwriting same in a memory area into which an oldest received facsimile message is stored when said first memory is in the full state.

4. A method for re-transmitting a facsimile message according to claim 1, wherein said facsimile numbers are dialed sequentially in an order of their storage, and are cleared from the second memory after being dialed.

5. A method for re-transmitting a facsimile message according to claim 1, wherein said first memory comprises a random access memory.

6. A method for re-transmitting a facsimile message in a facsimile including first and second memories, comprising the steps of:

receiving the facsimile message from a calling facsimile;

storing, in said first memory, said received facsimile message together with receiving information for said facsimile message and a selection number for selecting said received facsimile message;

storing, in said second memory, facsimile numbers for subscribers to which said received facsimile is to be re-transmitted; and dialing said facsimile numbers stored in the second memory to re-transmit the received facsimile message stored in said first memory to said subscribers;

wherein said second memory comprises a buffer memory provided in a central processing unit of said facsimile.

7. An apparatus for re-transmitting a facsimile message in a facsimile, comprising:

receiving means for receiving the facsimile message from a calling facsimile;

first memory means for storing said received facsimile message together with receiving information for said facsimile message and a selection number for selecting said received facsimile message;

second memory means for storing facsimile numbers for subscribers to which said received facsimile message is to be re-transmitted;

dialing means for dialing said facsimile numbers stored in said second memory means so as to re-transmit the received facsimile message stored in said first memory means to said subscribers;

user input means for receiving a request by a user for printing of a re-transmission list; and printing means for printing said receiving information and said selection number stored in said first memory means in response to the request by the user for printing the re-transmission list.

8. An apparatus according to claim 7, wherein said first memory means comprises a random access memory.

9. An apparatus according to claim 7, wherein said receiving information comprises a facsimile number for the calling facsimile, a transmission data and time, and a number of pages.

10. An apparatus according to claim 7, further comprising:

checking means for checking whether or not said first memory means is in a full state; and means responsive to a determination by said checking means that said first memory means is in the full state for storing said received facsimile message by overwriting said received facsimile message in a memory area into which an oldest received facsimile message is stored.

11. An apparatus according to claim 7, wherein said dialing means dials said facsimile numbers sequentially in an order of their storage, said apparatus further comprising clearing means for clearing said facsimile numbers from said second memory means after they are dialed.

12. An apparatus for re-transmitting a facsimile message in a facsimile, comprising:

receiving means for receiving the facsimile message from a calling facsimile;

first memory means for storing said received facsimile message together with receiving information for said facsimile message and a selection number for selecting said received facsimile message;

second memory means for storing facsimile numbers for subscribers to which said received facsimile message is to be re-transmitted;

dialing means for dialing said facsimile numbers stored in said second memory means so as to re-transmit the received facsimile message stored in said first memory means to said subscribers;

wherein said facsimile contains a central processing unit, and wherein said second memory means comprises a buffer memory provided in said central processing unit.

13. A method for re-transmitting a facsimile message received from a calling facsimile, comprising the steps of:

determining whether or not said facsimile message has been received;

when said facsimile message is received, storing said received facsimile message in a memory;

determining whether or not said memory is full;

when said memory is full, storing said received facsimile message into an oldest memory area within said memory;

printing said received facsimile message;

when said facsimile message is not received determining whether or not a re-transmission key input is present; and when said re-transmission key input is present, printing a re-transmission list.

14. A method according to claim 13, further comprising the steps of:

determining whether a facsimile number is input by a user;

after said facsimile number is input, determining whether or not an end key is input; and when the end key is input, dialing the input facsimile number.

15. A method according to claim 14, further comprising the steps of:

after the input facsimile number is dialed, determining whether or not a calling tone is received;

when the calling tone is received, determining whether or not a start key is input; and when the calling tone is received and the start key is input, transmitting the facsimile message.

16. A method according to claim 13, further comprising the steps of:

determining whether an input facsimile number is dialed;

after the input facsimile number is dialed, determining whether or not a calling tone is received;

when the calling tone is received, determining whether or not a start key is input; and when the calling tone is received and the start key is input, transmitting the facsimile message.

17. A method according to claim 15, further comprising the steps of:

determining whether or not a facsimile message is selected; and when said facsimile message is selected, enabling the input of a facsimile number.

18. A method according to claim 17, further comprising the steps of:

after said facsimile number is input, determining whether or not an end key is input; and when the end key is input, dialing the input facsimile number.

19. A method according to claim 18, further comprising the steps of:

after the input facsimile number is dialed, determining whether or not a calling tone is received;

when the calling tone is received, determining whether or not a start key is input; and when the calling tone is received and the start key is input, transmitting the facsimile message.

20. A method according to claim 13, further comprising the steps of:

determining whether or not a facsimile message is selected; and when said facsimile message is selected, enabling the input of a facsimile number.

21. A method according to claim 20, further comprising the steps of:

after said facsimile number is input, determining whether or not an end key is input; and when the end key is input, dialing the input facsimile number.

22. A method according to claim 21, further comprising the steps of:

after the input facsimile number is dialed, determining whether or not a calling tone is received;

when the calling tone is received, determining whether or not a start key is input; and when the calling tone is received and the start key is input, transmitting the facsimile message.

23. An apparatus for re-transmitting a facsimile message received from a calling facsimile, comprising:

means for determining whether or not said facsimile message has been received;

means responsive to said facsimile message being received for storing said received facsimile message in a memory;

means for determining whether or not said memory is full;

means responsive to said memory being full for storing said received facsimile message into an oldest memory area within said memory;

printing means for printing said received facsimile message; and means responsive to said facsimile message not being received for determining whether or not a re-transmission key input is present;

said printing means being responsive to said re-transmission key input being present for printing a re-transmission list.

24. An apparatus according to claim 23, further comprising:

means for determining whether or not a facsimile message is selected; and means responsive to said facsimile message being selected for enabling input of a facsimile number.

25. An apparatus according to claim 24, further comprising:

means responsive to said facsimile number being input for determining whether or not an end key is input; and means responsive to the end key being input for dialing the input facsimile number.

26. An apparatus according to claim 25, further comprising:

means responsive to the input facsimile number being dialed for determining whether or not a calling tone is received;

means responsive to the calling tone being received for determining whether or not a start key is input; and means responsive to the calling tone being received and the start key being input for transmitting the facsimile message.

27. An apparatus according to claim 23, further comprising:

means for dialing an input facsimile number;

means responsive to the input facsimile number being dialed for determining whether or not a calling tone is received;

means responsive to the calling tone being received for determining whether or not a start key is input; and means responsive to the calling tone being received and the start key being input for transmitting the facsimile message.

28. An apparatus according to claim 23, further comprising:

means for determining whether or not a facsimile message is selected; and means responsive to said facsimile message being selected for enabling the input of a facsimile number.

29. An apparatus according to claim 28, further comprising:

means responsive to said facsimile number being input for determining whether or not an end key is input; and means responsive to the end key being input for dialing the input facsimile number.

30. An apparatus according to claim 29, further comprising:

means responsive to the input facsimile number being dialed for determining whether or not a calling tone is received;

means responsive to the calling tone being received for determining whether or not a start key is input; and means responsive to the calling tone being received and the start key being input for transmitting the facsimile message.

31. An apparatus according to claim 23, further comprising:

means for enabling input of a facsimile number;

means responsive to said facsimile number being input for determining whether or not an end key is input; and means responsive to the end key being input for dialing the input facsimile number.

32. An apparatus according to claim 31, further comprising:

means responsive to the input facsimile number being dialed for determining whether or not a calling tone is received;

means responsive to the calling tone being received for determining whether or not a start key is input; and means responsive to the calling tone being received and the start key being input for transmitting the facsimile message.

\* \* \* \* \*